(12) United States Patent
Lee et al.

(10) Patent No.: US 11,391,816 B2
(45) Date of Patent: Jul. 19, 2022

(54) METHOD FOR REAL-TIME MONITORING OF CALIBRATION BIAS IN RADAR REFLECTIVITY, RECORDING MEDIUM AND DEVICE FOR PERFORMING THE METHOD

(71) Applicant: KOREA METEOROLOGICAL ADMINISTRATION, Seoul (KR)

(72) Inventors: Jeong-Eun Lee, Gwangmyeong-si (KR); SooHyun Kwon, Seoul (KR); Sung-Hwa Jung, Seoul (KR)

(73) Assignee: KOREA METEOROLOGICAL ADMINISTRATION, Seoul (KR)

( * ) Notice: Subject to any disclaimer, the term of this patent is extended or adjusted under 35 U.S.C. 154(b) by 0 days.

(21) Appl. No.: 17/376,061

(22) Filed: Jul. 14, 2021

(65) Prior Publication Data
US 2022/0065988 A1    Mar. 3, 2022

(30) Foreign Application Priority Data
Aug. 31, 2020   (KR) .................. 10-2020-0110215

(51) Int. Cl.
*G01S 7/40*    (2006.01)
*G01S 13/95*   (2006.01)
*G01S 7/02*    (2006.01)

(52) U.S. Cl.
CPC ............ *G01S 7/4021* (2013.01); *G01S 7/024* (2013.01); *G01S 13/95* (2013.01)

(58) Field of Classification Search
CPC ........ G01S 13/95; G01S 13/951; G01S 7/025; G01S 7/024; G01S 7/4021; G01S 13/958;
(Continued)

(56) References Cited

U.S. PATENT DOCUMENTS 6,061,013 A * 5/2000 Sauvageot .............. G01S 7/025
                                                            342/26 R
6,081,220 A * 6/2000 Fujisaka ................ G01S 13/951
                                                               702/3
(Continued)

FOREIGN PATENT DOCUMENTS

CN       110488393 A  * 11/2019
EP         3537176 A1 *  9/2019  ........... G01S 13/424
(Continued)

OTHER PUBLICATIONS

Jeong-Eun Lee et al. "Hybrid pulse-based small weather radar correction error calculation" Proceedings of the Autumn Meeting of KMS. Oct. 2019.

*Primary Examiner* — Olumide Ajibade Akonai
(74) *Attorney, Agent, or Firm* — Novick, Kim & Lee, PLLC; Sang Ho Lee; Hyun Woo Shin

(57) ABSTRACT

A method for monitoring a real-time calibration bias in radar reflectivity includes monitoring a radar reflectivity change by calculating a relative bias of reflectivity based on the change in reflectivity to ground echo reflectivity of a specific time, estimating calibration bias in reflectivity from the relative bias of reflectivity and a differential phase based on self-consistency between dual-polarimetric variables during a rainfall period, verifying the calibration bias in reflectivity by calculating a reflectivity mean bias through comparison of reflectivity of an overlapping area between two adjacent radars in a radar observation network by applying the estimated calibration bias to each of the two adjacent radars, and recalculating the calibration bias in reflectivity when the reflectivity mean bias between the two adjacent radars is larger than a first threshold. Accordingly, it is possible to provide the calibrated reflectivity data in real-time.

16 Claims, 15 Drawing Sheets

(58) Field of Classification Search
CPC ........ G01S 7/4004; G01S 7/40; G01S 7/4008; G01W 1/10
USPC .................................... 342/26 R, 174; 702/3
See application file for complete search history.

(56) References Cited

U.S. PATENT DOCUMENTS

| | | | | |
|---|---|---|---|---|
| 6,473,026 | B1* | 10/2002 | Ali-Mehenni | G01S 7/025 342/26 R |
| 7,417,577 | B2* | 8/2008 | Testud | G01S 13/95 73/170.16 |
| 7,898,459 | B2* | 3/2011 | Venkatachalam | G01S 7/025 342/26 R |
| 8,203,480 | B1* | 6/2012 | Woodell | G01S 7/4026 342/26 B |
| 9,348,015 | B2* | 5/2016 | Lim | G01S 7/025 |
| 10,345,431 | B1* | 7/2019 | Romines | H01Q 1/00 |
| 2011/0267224 | A1* | 11/2011 | Venkatachalam | G01S 13/951 342/26 R |
| 2012/0256785 | A1* | 10/2012 | Balaji | G01S 7/4021 342/174 |
| 2019/0187248 | A1* | 6/2019 | Lim | G01S 13/95 |

FOREIGN PATENT DOCUMENTS

| | | |
|---|---|---|
| KR | 10-1781609 B1 | 9/2017 |
| KR | 10-1796189 B1 | 11/2017 |
| KR | 10-1871316 B1 | 6/2018 |
| KR | 10-2032481 B1 | 10/2019 |

* cited by examiner

METHOD FOR REAL-TIME MONITORING OF CALIBRATION BIAS IN RADAR REFLECTIVITY, RECORDING MEDIUM AND DEVICE FOR PERFORMING THE METHOD

CROSS-REFERENCE TO RELATED APPLICATIONS

This application claims priority under 35 U.S.C. § 119 to Korean Patent Application No. 10-2020-0110215, filed on Aug. 31, 2020, in the Korean Intellectual Property Office, the disclosure of which is incorporated herein by reference in its entirety.

TECHNICAL FIELD

The present disclosure relates to a method for real-time monitoring of a calibration bias in radar reflectivity and a recording medium and a device for performing the same, and more particularly, to real-time reflectivity monitoring using precipitation echoes and ground echoes and precipitation echo-based calibration bias calculation.

BACKGROUND

Calibration of radar systems is required to acquire high quality observation data and improve the algorithm (quantitative precipitation estimation, hydrometeor classification) performance. Additionally, mis-calibration of radar systems causes discontinuity between radars for the same location in the radar observation network.

Accordingly, it is necessary to calibrate biases in reflectivity systems to minimize hardware-induced biases and maintain the quality of radar data. However, despite routine inspection, the bias in systems occurs due to the precision and degree of fatigue of individual components depending on the operating environment, so it is important to calculate the calibration bias in reflectivity in real-time.

The calibration bias in reflectivity can be calculated using self-consistency between dual-polarimetric variables. The self-consistency based method uses a relationship between dual-polarimetric variables. Since a specific differential phase is not affected by beam blockage, calibration bias and attenuation, the calibration bias may be calculated by comparing a differential phase calculated by accumulating the specific differential phase calculated from reflectivity with an observed differential phase.

However, the method using self-consistency provides the calibration bias in reflectivity but fails to monitor changes in calibration bias for the non-rainfall period and cannot be applied in wintertime in which the precipitation type is usually snowfall.

SUMMARY

The present disclosure addresses this situation, and therefore the present disclosure is directed to providing a method for real-time monitoring of a calibration bias in radar reflectivity.

The present disclosure is further directed to providing a recording medium having recorded thereon a computer program for performing the method for real-time monitoring of the calibration bias in radar reflectivity.

The present disclosure is further directed to providing a device for performing the method for real-time monitoring of the calibration bias in radar reflectivity.

The self-consistency-based method using a relationship between dual-polarimetric variables may not be adequate to monitor changes in calibration bias during the non-rainfall period. However, the presented disclosure is able to monitor the calibration bias even when there is no precipitation by estimating the calibration bias using the change in relative bias and the self-consistency. In particular, the present disclosure provides an improved technology in view of prior art by monitoring, calculating, and verifying the calibration bias in radar reflectivity in real-time through monitoring the reflectivity of ground echoes regardless of weather conditions and based on self-consistency between dual-polarimetric variables.

To achieve the above-described object, a method for real-time monitoring of the calibration bias in radar reflectivity according to an embodiment includes monitoring a radar reflectivity change by calculating a relative bias of reflectivity based on a change in reflectivity to ground echo reflectivity of a specific time, estimating calibration bias in reflectivity from the relative bias of reflectivity and the differential phase based on self-consistency between dual-polarimetric variables for a rainfall period, verifying the calibration bias in reflectivity by calculating a mean bias through comparison of reflectivity in an overlapping area between two adjacent radars in a radar observation network by applying the estimated calibration bias to each radar, and recalculating the calibration bias in reflectivity when the mean bias between the two adjacent radars is larger than a first threshold.

In an embodiment of the present disclosure, monitoring the radar reflectivity change may include if ground echo map does not exist to generate a ground echo map and a baseline for reflectivity, and if the ground echo map exists, calculating the relative bias of reflectivity using the ground echo map and the baseline.

In an embodiment of the present disclosure, if the ground echo map does not exist to generate the ground echo map and the baseline may include accumulating frequency of a reflectivity for each bin for a selected period and defining as ground echo, determining validity of observation data based on a ratio of ground echo area to a total observation area, extracting ground echo reflectivity from valid observation data, calculating ground echo reflectivity statistics by arranging the extracted ground echo reflectivity in an ascending order, and generating the baseline for azimuth slip indicator and relative bias calculation to compare the ground echo reflectivity statistics with those at next time.

In the other embodiment of the present disclosure, when there is the ground echo map, calculating the relative bias of reflectivity using the ground echo map and the baseline may include extracting the ground echo reflectivity from the ground echo map within a predetermined time on the basis of input time, calculating ground echo reflectivity statistics by arranging the extracted ground echo reflectivity in the ascending order, determining if an azimuth angle is rotated by comparing an absolute value of a difference between a predefined percentile of baseline data and a same percentile of a present time with a preset second threshold, calculating the relative bias of reflectivity when it is determined that the azimuth angle is not rotated, calculating a change in relative bias from the calculated relative bias of reflectivity, and calculating the calibration bias when the calculated the change in relative bias is larger than a preset third threshold.

In an embodiment of the present disclosure, when there is the ground echo map, calculating the relative bias of reflectivity using the ground echo map and the baseline may further include when it is determined that the azimuth angle is rotated, removing the ground echo map for updating, and failing to calculate the relative bias of the corresponding time.

In an embodiment of the present disclosure, estimating the calibration bias in reflectivity may include calculating the calibration bias using self-consistency of reflectivity and specific differential phase shift when precipitation exists, and estimating the calibration bias using the change in relative bias and the calculated calibration bias when there is no precipitation.

In an embodiment of the present disclosure, calculating the calibration bias using self-consistency of reflectivity and specific differential phase shift when precipitation exists may further include extracting a differential phase pair in a precipitation area selected from radar volume data, and calculating the calibration bias from the differential phase pair by determining if precipitation ended using a precipitation echo area ratio.

In an embodiment of the present disclosure, extracting the differential phase pair may include calculating the precipitation echo area ratio from radar data, selecting the precipitation area using a preset maximum distance and a cross-correlation coefficient, removing an influence of observation bias except the calibration bias, calculating the differential phase from reflectivity in the precipitation area from which the influence of the observation bias is removed, and extracting the differential phase pair by filtering the observed differential phase at least once.

In an embodiment of the present disclosure, removing the influence of the observation bias except the calibration bias may include removing a blockage area by excluding the azimuth angle at which beam blockage fraction (BBF) is equal to or larger than a preset fourth threshold using a beam blockage map, removing to avoid contamination by wet radome when an average of reflectivity observed in a preset bin range is larger than a preset fifth threshold, and correcting a precipitation attenuation-induced reflectivity loss by accumulating attenuation calculated using a reflectivity and attenuation relation equation for precipitation in a range direction.

In an embodiment of the present disclosure, calculating the calibration bias may include analyzing the precipitation echo area ratio within a predetermined time earlier on the basis of input time, comparing the precipitation echo area ratio with a preset sixth threshold, determining to be non-precipitation when the precipitation echo area ratio is less than a preset seventh threshold, determining if the number of extracted differential phase pairs is equal to or larger than a preset eighth threshold when it is determined to be non-precipitation, and calculating the calibration bias in reflectivity when the number of extracted differential phase pairs is equal to or larger than a preset ninth threshold.

In an embodiment of the present disclosure, verifying the calibration bias in reflectivity may include selecting the overlapping area having a same distance and a same height of the two adjacent radars, extracting a reflectivity pair by correcting observation bias in reflectivity at the overlapping area, and calculating a mean bias using the extracted reflectivity pair.

In an embodiment of the present disclosure, selecting the overlapping area may include calculating observation areas of the two adjacent radars and a distance (d) between the radars from a beam blockage map, comparing the distance between the two adjacent radars with a preset tenth threshold, extracting the azimuth angle of the overlapping area when the distance between the two adjacent radars is smaller than a preset eleventh threshold, calculating a beam height for each elevation angle at an equidistant center between the two adjacent radars, selecting an optimal elevation angle at which the calculated beam height is within a preset threshold range, the beam center is present in each other's beam width, and a height difference of the beam center is equal to or less than a preset twelfth threshold, extracting a bin in which a distance (r) from the radar is equal to or less than a preset thirteenth threshold for the optimal elevation angle, and preparing a lookup table including elevation angle, the azimuth angle and bin number for each site of the extracted bin.

In an embodiment of the present disclosure, extracting the reflectivity pair may include applying the estimated calibration bias in reflectivity to radar data, correcting a beam blockage-induced reflectivity loss from the beam blockage map, correcting the precipitation attenuation-induced reflectivity loss by accumulating attenuation calculated using a reflectivity and attenuation relation equation for precipitation in a range direction, removing a blockage area by excluding a bin in which BBF is equal to or larger than a preset fourteenth threshold, and extracting the reflectivity pair in the overlapping area.

In an embodiment of the present disclosure, calculating the mean bias may include calculating the reflectivity mean bias between the two radars in the overlapping area by calculating an average of reflectivity difference from the reflectivity pair.

In an embodiment of the present disclosure, recalculating the calibration bias in reflectivity may include when the mean bias between the two adjacent radars is larger than a fifteenth threshold, determining radar that needs recalculation by analyzing the mean bias calculated through comparison with a different radar, and recalculating the calibration bias in reflectivity for the radar determined to need recalculation based on the mean bias calculated from the different radar.

To achieve another object of the present disclosure, a computer-readable storage medium according to an embodiment has recorded thereon a computer program for performing the method for real-time monitoring of the calibration bias in radar reflectivity.

To achieve still another object of the present disclosure, a device for real-time monitoring of calibration bias in radar reflectivity according to an embodiment includes a bias monitoring unit to monitor a radar reflectivity change by calculating a relative bias of reflectivity based on the change in reflectivity to ground echo reflectivity of a specific time, a bias calculation unit to estimate calibration bias in reflectivity from the relative bias of reflectivity and a differential phase based on self-consistency between dual-polarimetric variables for a rainfall period, a bias verification unit to verify the calibration bias in reflectivity by calculating a mean bias through comparison of reflectivity in an overlapping area between two adjacent radars in a radar observation network by applying the estimated calibration bias to each radar, and a calibration bias recalculation unit to recalculate the calibration bias in reflectivity when the mean bias between the two adjacent radars is larger than a threshold.

According to the method for real-time monitoring of the calibration bias in radar reflectivity, it is possible to monitor, calculate and verify calibration bias in weather radar reflectivity in real time through monitoring of the reflectivity of ground echoes regardless of weather condition, self-consistency of dual-polarimetric variables, and comparison of reflectivity between two radars.

It is possible to use high quality radar data through real-time calculation of calibration bias in radar reflectivity, and monitor if there is a change in radar calibration bias after radar hardware inspection in real time.

DETAILED DESCRIPTION OF EMBODIMENTS

Figure 1:
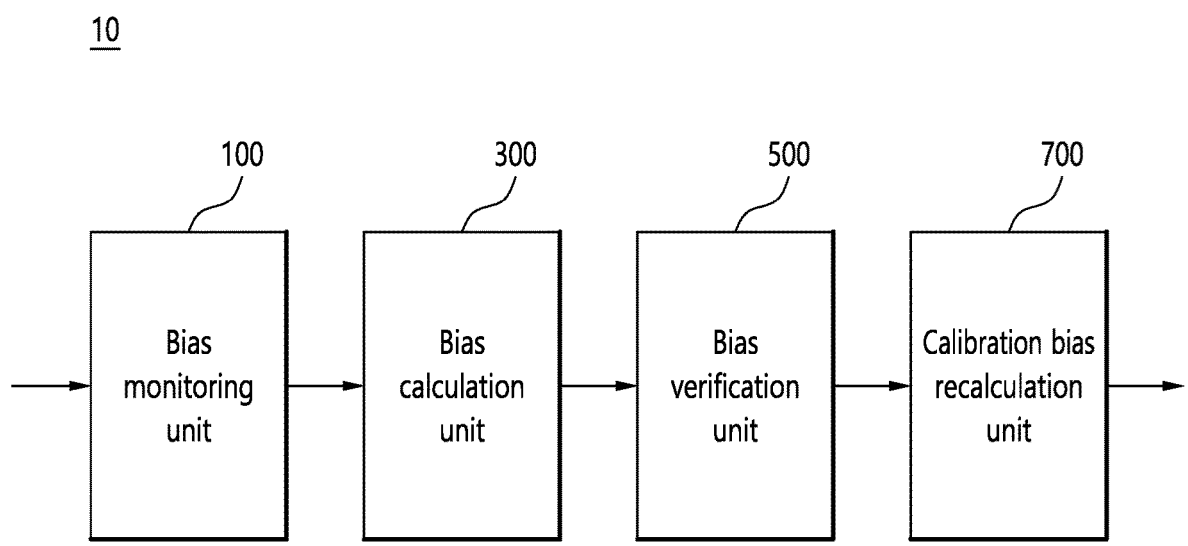
FIG. 1 is a block diagram of a device for real-time monitoring of a calibration bias in radar reflectivity according to an embodiment of the present disclosure.

The following detailed description of the present disclosure is made with reference to the accompanying drawings, in which particular embodiments for practicing the present disclosure are shown for illustration purposes. These embodiments are described in sufficiently detail for those skilled in the art to practice the present disclosure. It should be understood that various embodiments of the present disclosure are different but do not need to be mutually exclusive. For example, particular shapes, structures and features described herein in connection with one embodiment may be implemented in other embodiment without departing from the spirit and scope of the present disclosure. It should be further understood that changes may be made to the positions or placement of individual elements in each disclosed embodiment without departing from the spirit and scope of the present disclosure. Accordingly, the following detailed description is not intended to be taken in limiting senses, and the scope of the present disclosure, if appropriately described, is only defined by the appended claims along with the full scope of equivalents to which such claims are entitled. In the drawings, similar reference signs denote same or similar functions in many aspects.

Hereinafter, the preferred embodiments of the present disclosure will be described in more detail with reference to the accompanying drawings.

Hereinafter, the term "unit" is defined herein as having its broadest definition to ordinary skill in the art to refer to software including instructions executable in a non-transitory computer-readable medium that would perform the associated function when executed, a circuit or a processor designed to perform the associated function, hardware designed to perform the associated function, or a combination of them.

FIG. 1 is a block diagram of a device for real-time monitoring of calibration bias in radar reflectivity according to an embodiment of the present disclosure.

The device 10 for real-time monitoring of calibration bias in radar reflectivity according to the present disclosure (hereinafter, the device) performs relative bias calculation through ground echo reflectivity monitoring, calibration bias calculation using self-consistency of dual-polarimetric variables and reflectivity mean bias calculation between adjacent radars.

The relative bias of reflectivity may be calculated as the change in reflectivity to ground echo reflectivity of a specific time, and the calibration bias may be estimated by monitoring changes in relative bias. The calibration bias in reflectivity is calculated using a relationship between dual-polarimetric variables for precipitation during the rainfall period. Consistency of radar observation data is verified by calculating a reflectivity mean bias between the two radars after calibrating the reflectivity using the two methods.

Referring to FIG. 1, the device 10 according to the present disclosure includes a bias monitoring unit 100, a bias calculation unit 300, a bias verification unit 500 and a calibration bias recalculation unit 700.

The device 10 of the present disclosure may run software (application) for real-time monitoring of calibration bias in radar reflectivity thereon, and the bias monitoring unit 100, the bias calculation unit 300, the bias verification unit 500 and the calibration bias recalculation unit 700 may be controlled by the software for real-time monitoring of calibration bias in radar reflectivity running on the device 10.

The device 10 may be a separate terminal or modules of the terminal. Additionally, the bias monitoring unit 100, the bias calculation unit 300, the bias verification unit 500 and the calibration bias recalculation unit 700 may be formed as an integrated module or at least one module. However, to the contrary, each element may be formed as a separate module.

The device 10 may be in the form of a server or an engine, and may be interchangeably used with a device, an apparatus, a terminal, user equipment (UE), a mobile station (MS), a wireless device and a handheld device. The device 10 may be mobile or fixed.

The device 10 may execute or create a variety of software based on an Operation System (OS), namely, a system. The OS is a system program for enabling software to use the hardware of the device, and may include mobile computer OS including Android OS, iOS, Windows Mobile OS, Bada OS, Symbian OS and Blackberry OS and computer OS including Windows family, Linux family, Unix family, MAC, AIX and HP-UX.

The bias monitoring unit 100 monitors changes in radar reflectivity by calculating a relative bias of reflectivity based on the change in reflectivity to ground echo reflectivity of a specific time.

In the calculation of the relative bias of reflectivity through ground echo reflectivity monitoring, when there is no ground echo map, after a ground echo map is generated, baseline data is generated to determine the azimuth slip and calculate the relative bias. In contrast, when there is a ground echo map, the relative bias is calculated using the ground echo map and the baseline.

The relative bias calculation method using ground echoes monitors changes in calibration bias using reflectivity statistics of ground echoes which always have constant intensity. To calculate the ground echo reflectivity statistics, it is necessary to generate the ground echo map. After accumulating the frequency of reflectivity of 50 dBZ or more for each bin for the selected period, the frequency of 95% or more over the accumulation time within 10 km from the radar is defined as ground echo as shown in the following Equation 1.

$$\text{Ground echo} = \left(\frac{\text{Frequency of 50 dBZ or more}}{\text{Number of accumulated PPIs}} \times 100\right) > \quad \text{[Equation 1]}$$
$$95\%(\text{Distance from radar} < 10 \text{ km})$$

After the ground echo map is generated, the baseline is determined to compare with the ground echo reflectivity statistics of the next time. To determine the baseline, the ground echo reflectivity is extracted using data used to generate the ground echo map.

To determine the validity of reflectivity data when extracting the ground echo data, a ratio of ground echo area (reflectivity of 50 dBZ or more and cross-correlation coefficient of 0.95 or less) to the total observation area is calculated. When the ratio of ground echo area is smaller than 0.0001, the observation data is determined to be invalid.

The ground echo reflectivity statistics ($95^{th}$ percentile, $50^{th}$ percentile) are calculated by arranging the extracted ground echo reflectivity in the ascending order. The $50^{th}$ percentile $Z_{baseline,\ 50th}$ is used to determine the azimuth slip of the ground echo map, and the $95^{th}$ percentile $Z_{baseline,\ 95th}$ is used to calculate the relative bias.

After reading the ground echo map, the ground echo reflectivity is extracted from data within 1 hour on the basis of input time by the same method as the method of extracting the ground echo reflectivity statistics. The ground echo reflectivity statistics ($95^{th}$ percentile, $50^{th}$ percentile) are calculated by extracting and arranging the ground echo reflectivity in the ascending order.

When the absolute value of a difference between $50^{th}$ percentile $Z_{baseline,\ 50th}$ of the baseline data and $50^{th}$ percentile $Z_{c,\ 50th}$ of the corresponding time is larger than 10.0 dB, it is determined that the azimuth angle is rotated. When it is determined that the azimuth angle of the ground echo map is rotated, the azimuth bias is removed to update the ground echo map and the relative bias of the corresponding time is not calculated.

When it is determined that the azimuth angle of the ground echo map is not rotated, a relative bias is calculated. The relative bias is calculated as shown in the following Equation 2 using $95^{th}$ percentile $Z_{baseline,\ 95th}$ of the baseline data and $95^{th}$ percentile $Z_{c,\ 95th}$ of the corresponding time.

$$RCA(dB) = Z_{baseline, 95th} - Z_{c, 95th} \quad \text{[Equation 2]}$$

Figure 2:
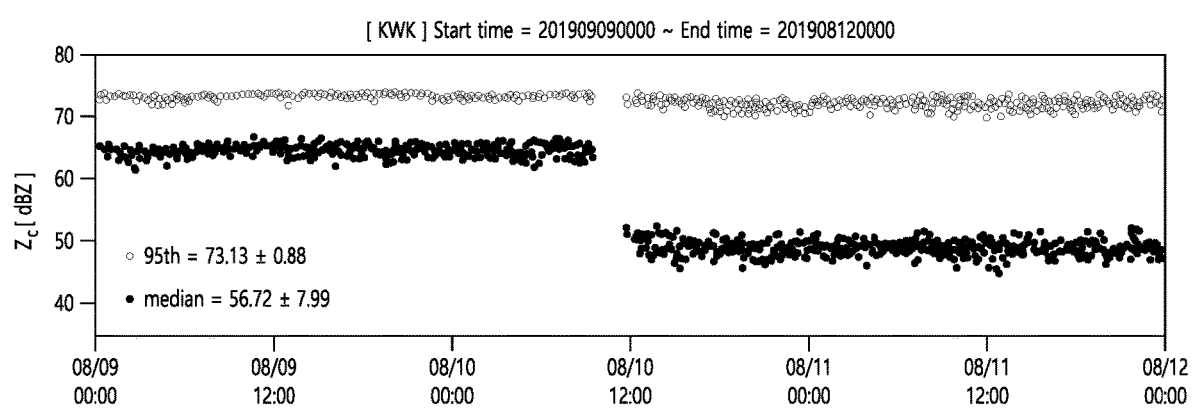
FIG. 2 is a graph showing ground echo reflectivity statistics calculated in every volume data from Aug. 9, 2019 000 KST to Aug. 12, 2019 0000 KST in Gwanak Mountain radar.

FIG. 2 shows the result of calculating the ground echo reflectivity statistics $Z_{c,\ 50th}$, $Z_{c,\ 95th}$ every five minutes from Aug. 9, 2019 0000 KST to Aug. 12, 2019 0000 KST in Gwanak Mountain radar. When operating again after pausing observation for regular inspection from August 10, 0925 KST to Aug. 10, 1140 KST, $50^{th}$ percentile $Z_{c,\ 50th}$ of ground echo reflectivity is greatly changed by 10.0 dB or more due to the azimuth slip of radar observation data.

To calculate the relative bias, it is necessary to construct a new ground echo map. Accordingly, when the azimuth slip occurs, the relative bias is not calculated, and the ground echo map is removed and a new ground echo map is generated at the next time.

Figure 3:
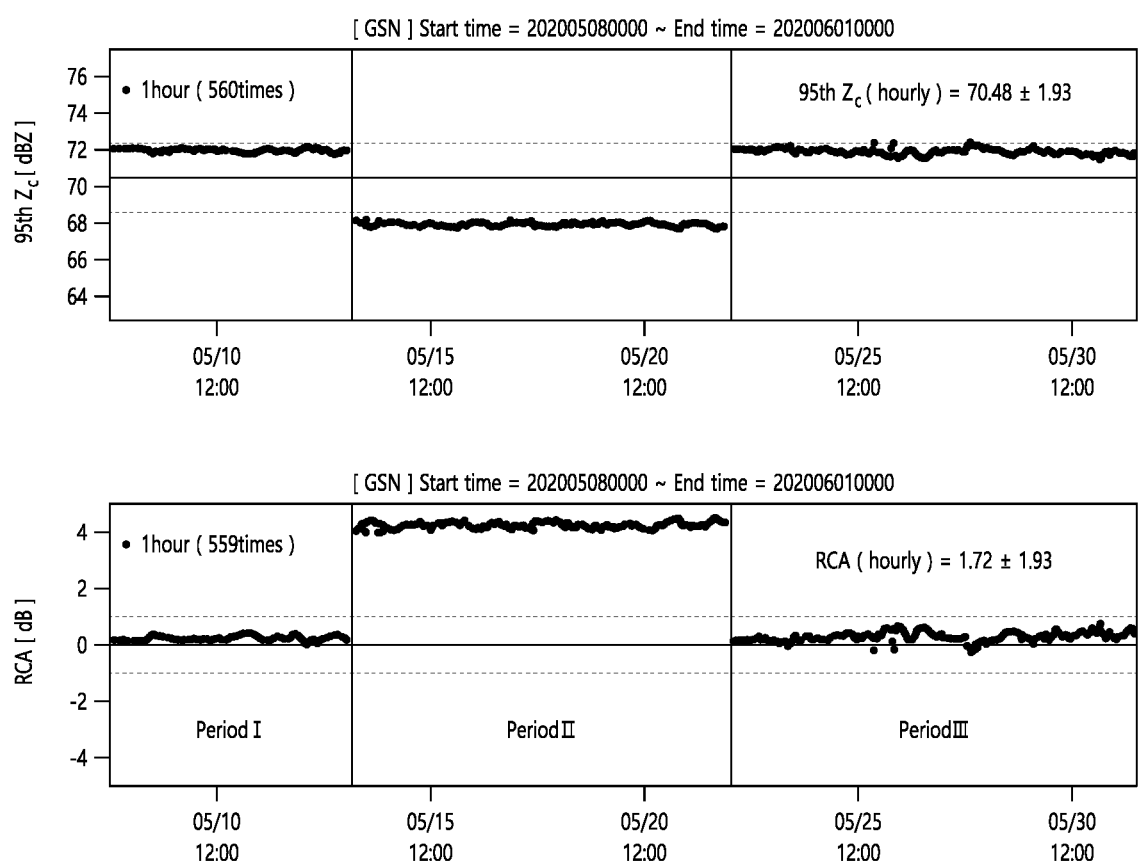
FIG. 3 is a graph showing $95^{th}$ percentile of ground echo reflectivity and relative bias from May 8, 2020 000 KST to Jun. 1, 2020 0000 KST in Gosan radar.

FIG. 3 shows the $95^{th}$ percentile of ground echo reflectivity and the relative bias of reflectivity from May 8, 2020, 0000 KST to Jun. 1, 2020, 0000 KST in Gosan radar. The first $95^{th}$ percentile at the upper part in FIG. 3 is used as the baseline $Z_{baseline,\ 95th}$ for relative bias calculation. Mean relative bias and standard deviation is 0.20±0.09, 4.23±0.10, 0.24±0.14 dB respectively for period I, period II and period III.

By definition, when the calibration bias increases, the relative bias decreases, and when the calibration bias decreases, the relative bias increases. To estimate the calibration bias by monitoring changes in relative bias, the change in relative bias ΔRCA is calculated. ΔRCA is defined as a difference between the past relative bias and the relative bias of the present time, and when ΔRCA is equal to or larger than 1.0 dB, it is determined that there is a change in calibration bias.

When there is a change in calibration bias, the calibration bias $\epsilon_{relative\ bias}$ is estimated from the calibration bias $\epsilon_{self-consistency}$ and ΔRCA calculated using self-consistency as shown in the following Equation 3.

$$\epsilon_{ground\ echo} = \epsilon_{self-consistency} - \Delta RCA \quad \text{[Equation 3]}$$

For example, the calibration bias calculated from May 9 precipitation event is −1.77 dB. The relative bias is changed by about 4.0 dB at the start time of period II, and the calibration bias is estimated to −5.80 dB. The calibration bias calculated from May 15 precipitation event is −6.13 dB which is very similar to the value considering the relative bias. In conclusion, it is possible to calculate the calibration bias during the non-rainfall period by monitoring the relative bias.

The bias calculation unit 300 estimates the calibration bias in reflectivity from the relative bias of reflectivity and a differential phase based on self-consistency between dual-polarimetric variables for the rainfall period.

The calculation of the calibration bias in reflectivity based on self-consistency of dual-polarimetric variables begins with reading radar volume data, followed by selecting a precipitation area, removing the influence of observation bias (partial beam blockage, wet radome, precipitation attenuation) except the calibration bias, and extracting a differential phase pair. To calculate the precipitation event-based calibration bias, determination is made as to whether precipitation ended using a precipitation echo area ratio and the calibration bias is calculated from the differential phase pair.

To calculate the calibration bias in reflectivity, the differential phase pair is extracted based on self-consistency between reflectivity-specific differential phase. When extracting the differential phase using self-consistency, it is necessary to minimize contamination by bright band and beam blockage.

The relationship between reflectivity-specific differential phase is valid for precipitation, and to remove contamination by bright band, the precipitation area is selected. The distance below the height of 1 km from the monthly mean height of bright band peak for each site is set as the maximum distance, and the precipitation area is limited using the cross-correlation coefficient. After the precipitation area is selected, the azimuth angle at which the beam blockage fraction (BBF) calculated from beam blockage simulation is equal to or larger than 10% is excluded to avoid contamination by beam blockage.

Additionally, to avoid contamination by wet radome, only when an average of reflectivity observed in the $5^{th}$ to $10^{th}$ bins is equal to or less than 30 dBZ, the differential phase is extracted. The following Equation 4 is used to correct the precipitation attenuation-induced reflectivity loss.

$$\Delta Z_H = 2\sum_{i=1}^{n} A_i \quad A = 3.348 \times 10^{-8} Z_H^{0.755} \quad \text{[Equation 4]}$$

Figure 4:
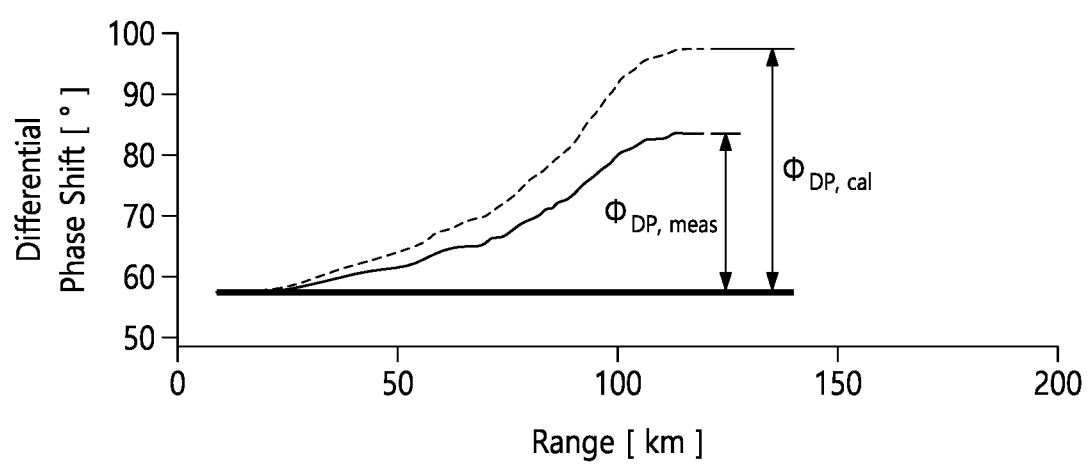
FIG. 4 is a conceptual diagram of a calculated differential phase and an observed differential phase.

The calibration bias in reflectivity is calculated by comparing the calculated differential phase with the observed differential phase for one azimuth angle. FIG. 4 is a conceptual diagram of the calculated differential phase $\Phi_{DP,cal}$ and the observed differential phase $\Phi_{DP,meas}$. The specific differential phase is calculated from reflectivity data using the following Equation 5 which is a reflectivity-attenuation relation equation for precipitation, and the differential phase is calculated by accumulating in the range direction as shown in Equation 6.

$$Z_H = 73300 K_{DP}^{1.1} \quad \text{[Equation 5]}$$

$$\Phi_{DP,cal} = 2 * \Sigma K_{DP} = 2 * \Sigma (Z_H/73300)^{1/1.1} \quad \text{[Equation 6]}$$

The observed differential phase is defined as the change in the precipitation area after iterative filtering (iteratively applying a finite impulse response (FIR) filter) due to observational noise. To avoid contamination by hail, the azimuth angle including bins in which reflectivity is equal to or larger than 45.0 dBZ is excluded, and only for the azimuth angle at which the distance between the starting point and the ending point of the precipitation area is a minimum of 10.0 km, when both the calculated differential phase and the observed differential phase are equal to or larger than 3°, the differential phase is extracted.

The calibration bias is calculated using the differential phase extracted during the precipitation event by determining whether precipitation ended. After reading precipitation echo area ratio data within 12 hours earlier on the basis of input time, determination is made as to whether precipitation ended. The precipitation echo area ratio is defined as a ratio of an area with the cross-correlation coefficient of more than 0.98 to the total observation area as shown in the following Equation 7.

$$\Phi_{DP,meas} \text{itation echo area ratio} = \quad \text{[Equation 7]}$$
$$\frac{\text{Area with cross-correlation coefficient} > 0.98}{\text{Total observation area}}$$

When the precipitation echo area ratio is less than 10%, it is determined as non-precipitation, and when the number of extracted differential phase pairs is 500 or more, the calibration bias in reflectivity is calculated as shown in the following Equation 8.

$$Z_H \text{absolute bias} = (10*b)\log\left(\frac{\sum \Phi_{DP,cal}\Phi_{DP,meas}}{\sum \Phi_{DP,meas}^2}\right) \quad \text{[Equation 8]}$$

Here, $\Phi_{DP,cal}$ denotes the calculated differential phase, and $\Phi_{DP,meas}$ denotes the observed differential phase. b is the factor of the reflectivity-attenuation relation equation.

Figure 5:
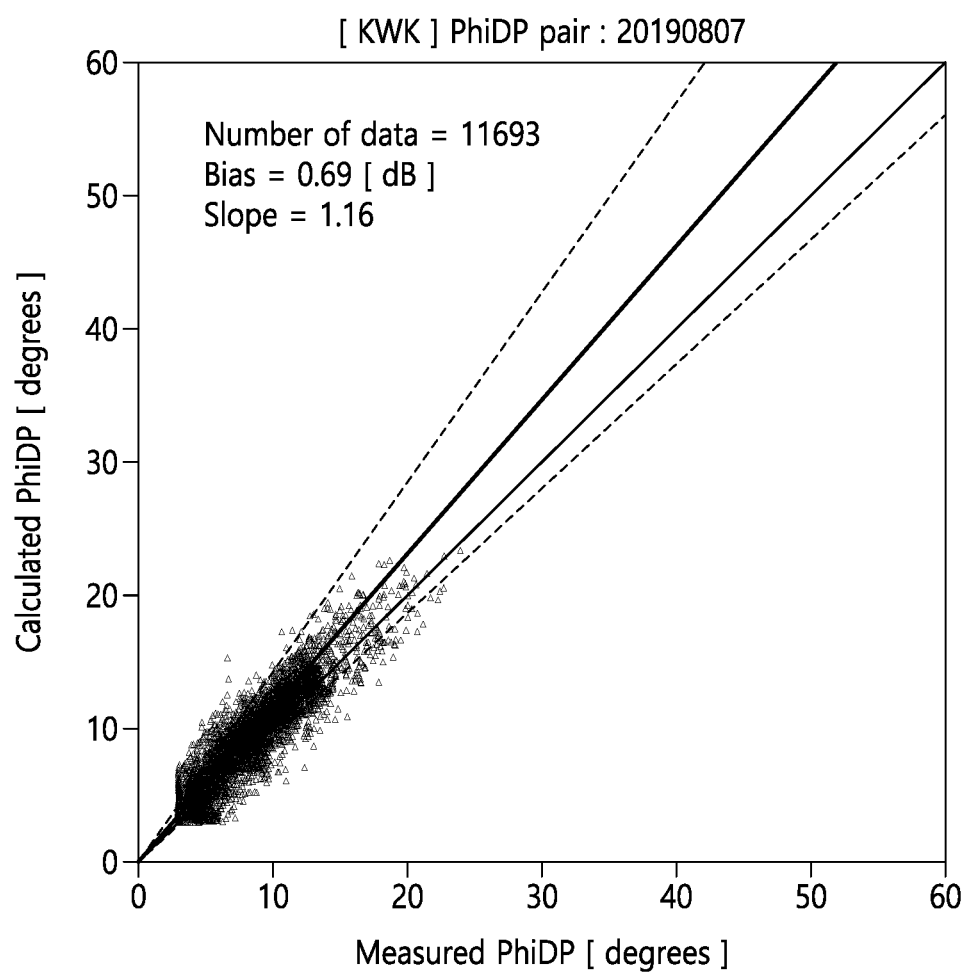
FIG. 5 is a graph showing the result of extracting a differential phase pair in Gwanak Mountain radar for Aug. 7, 2019 event.
Figure 6:
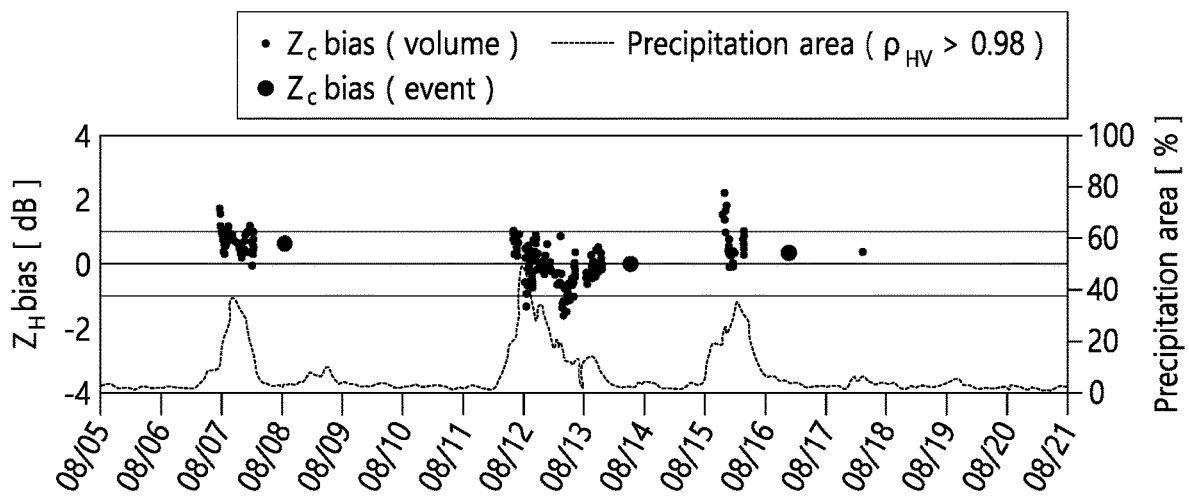
FIG. 6 is a graph showing a precipitation echo area ratio, volume based calibration bias and event based calibration bias from Aug. 5, 2019 to Aug. 21, 2019.

FIG. 5 shows the scatterplot of differential phase for Gwanak Mountain radar Aug. 7, 2019, event, and the calibration bias in reflectivity is 0.69 dB when calculated from Equation 8. FIG. 6 shows the precipitation echo area ratio, the volume based calibration bias and the calibration bias for each event from August 5 to August 21 in Gwanak Mountain radar. The calibration bias calculated for each precipitation event is 0.70, 0.06, 0.36 dB.

The bias verification unit 500 verifies the calibration bias in reflectivity by calculating a reflectivity mean bias through comparison of reflectivity in an overlapping area between two adjacent radars in the radar observation network by applying the estimated calibration bias to each radar.

The calculation of the reflectivity mean bias between adjacent radars is performed by selecting the overlapping area of the two radars, extracting a reflectivity pair by calibrating the reflectivity observation bias at the overlapping area, and calculating the reflectivity mean bias using the extracted reflectivity pair.

Figure 7:
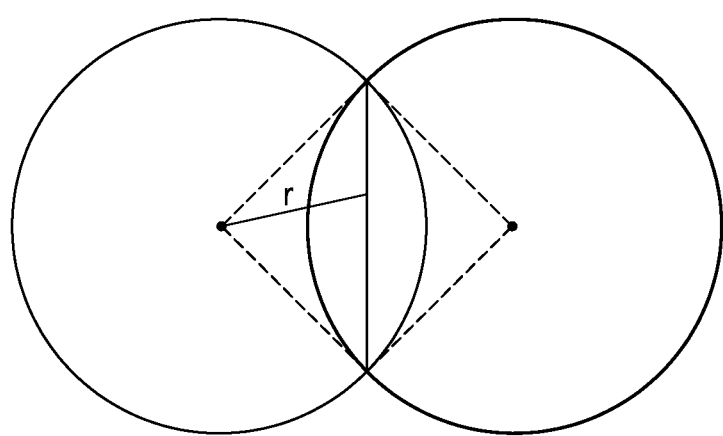
FIG. 7 is a diagram showing the azimuth angle in observation areas of two radars and an overlapping area and the distance from radar to equidistance.

To extract reflectivity data of the same location at which the two radars are observed, the overlapping area is selected. FIG. 7 shows the observation areas of the two radars and the distance d between the radars. When the distance d between the two radars in the radar observation network is shorter than 400 km, the azimuth angle of the overlapping area is extracted. In FIG. 7, the black solid line indicates the observation areas of the two radars and the equidistance, the black dashed line indicates the azimuth angle in the overlapping area, and r denotes the distance from the radar to the equidistance.

The beam height for each elevation angle at the equidistant center between the two radars is calculated as shown in Equation 9, and an elevation angle at which the beam height ranges between 0.5 and 3.0 km, the beam center is present in each other's beam width and a height difference of the beam center is equal to or less than 500 m is selected.

$$h = \sqrt{r^2 + a_e^2 + 2ra_e\sin\Phi} - a_e + h_0 \quad \text{[Equation 9]}$$

Here, h denotes the radar beam height, r denotes the propagation distance of the radar beam in the atmosphere, $a_e$ denotes the effective earth radius, $\Phi$ denotes the elevation angle, and $h_0$ denotes the radar height.

Figure 8:
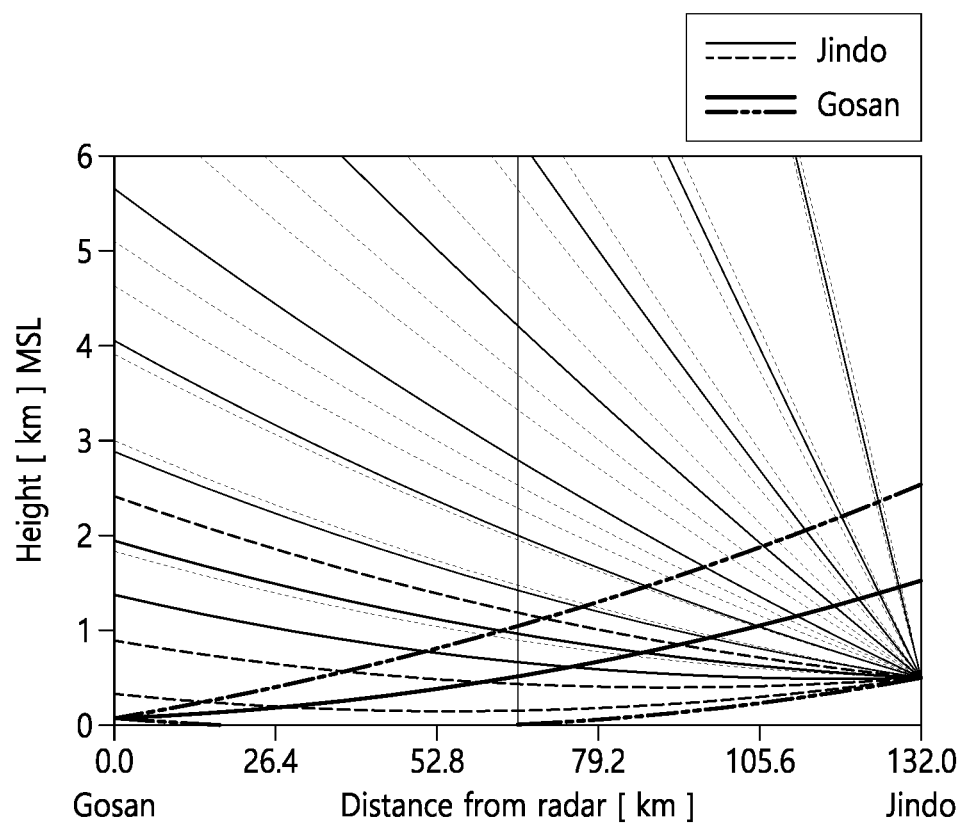
FIG. 8 is a graph showing the beam center height for each elevation angle and the beam height considering the beam width for each elevation angle of Gosan radar and Jindo radar at the equidistant center.

FIG. 8 shows the elevation angle selection process, the total of two elevation angles (first and second) is selected by calculating the beam height at the equidistant center (66.0 km) of the two radars for the first elevation angle of Gosan radar. Referring to FIG. 8, it shows the beam center height for each elevation angle of Gosan radar and Jindo radar at the equidistant center (solid line), and the dashed line indicates the beam height considering the beam width for each elevation angle.

A lookup table is prepared by extracting bins in which the distance r from radar is 200 km or less for the optimal elevation angle. The lookup table stores the elevation angle, the azimuth angle and the bin number for each site in the overlapping area.

The reflectivity data in the overlapping area is extracted by calibrating the observation bias (calibration bias, beam blockage, precipitation attenuation calibration). When extracting the reflectivity data, the BBF larger than 10% is excluded.

The BBF refers to the fractional loss of power caused by blockage, and is calculated under the assumption of beam propagation path in the standard atmosphere using digital elevation model (DEM) data of about 30 m horizontal resolution and Gaussian beam pattern (BBF=1 indicates total loss). The calibrated reflectivity $\Delta Z_H$ for each observation bias is shown in the following Equations 10 to 12, and the observed reflectivity is calibrated as shown in Equation 13. Specifically, Equation 10 represents the calibration bias, Equation 11 represents the beam blockage, and Equation 12 represents the calibrated reflectivity by precipitation attenuation.

$$\Delta Z_{H, calibration} = \epsilon_{self-consistency} \text{ or } \epsilon_{ground\ echo} \quad \text{[Equation 10]}$$

$$\Delta Z_{H, blockage} = -10\log_{10}(1 - BBF), BBF = \text{coverage} \quad \text{[Equation 11]}$$

$$\Delta Z_{H, attenuation} = 2\sum_{i=1}^{n} A_i A = 3.348 \times 10^{-6} Z_H^{0.755} \quad \text{[Equation 12]}$$

$$\Delta Z_{H, corrected} = \quad \text{[Equation 13]}$$
$$Z_{H, measured} + \Delta Z_{H, calibration} + \Delta Z_{H, blockage} + \Delta Z_{H, attenuation}$$

The reflectivity mean bias between the two radars is calculated as an average of reflectivity difference as shown in the following Equation 14 from the reflectivity data extracted in the overlapping area.

$$\text{Difference in reflectivity} = \quad \text{[Equation 14]}$$
$$Z_{H, comparative\ radar} - Z_{H, reference\ radar}$$

For simulation, the scatterplot of reflectivity is extracted before/after the application of the calibration bias in the overlapping area of Oseong Mountain and Gwanak Mountain radar and the overlapping area of Jindo and Oseong Mountain radar for May 15, 2020, precipitation event. The calibration bias calculated using self-consistency of Jindo, Oseong Mountain, and Gwanak Mountain radars is −6.30 dB, −1.46 dB, −0.21 dB, respectively.

The reflectivity mean bias between two radars before calibration is 2.35 dB, 4.04 dB, but the reflectivity mean bias after calibration is reduced to 1.09 dB, −0.84 dB. The consistency of observation data between two radars in the radar observation network may be achieved through reflectivity calibration.

The calibration bias recalculation unit 700 recalculates the calibration bias in reflectivity when the reflectivity mean bias between two adjacent radars is larger than the threshold.

Whether to recalculate the calibration bias in reflectivity may be determined by analyzing the reflectivity mean bias in the radar observation network. When the reflectivity mean bias between two radars is larger than ±1.0 dB, radar that needs recalculation is determined by analyzing the reflectivity mean bias calculated through comparison with a plurality of radars.

The following Table 1 shows the result of calculating the reflectivity mean bias between two radars after applying the calibration bias in reflectivity based on self-consistency for May 15 event. When comparing Seongsan radar with Gudeok Mountain radar, the reflectivity mean bias is larger than ±1.0 dB. Since the reflectivity mean bias of Gudeok Mountain-Myeonbong Mountain is smaller than the reflectivity mean bias of Seongsan-Gosan, among Seongsan and Gudeok Mountain radars, the calibration bias of Seongsan radar is recalculated.

TABLE 1

| | Reference | | | | | |
|---|---|---|---|---|---|---|
| | Oseong Mountain | Jindo | Gosan | Seongsan | Seongsan | Gudeok Mountain |
| | | | Comparison | | | |
| | Gwanak Mountain | Oseong Mountain | Jindo | Gosan | Gudeok Mountain | Myeonbong Mountain |
| Before calibration | 2.35 dB | 4.04 dB | −0.67 dB | −5.97 dB | −3.20 dB | 1.57 dB |
| After calibration | 1.09 dB | −0.84 dB | −0.48 dB | 0.90 dB | −1.09 dB | −0.10 dB |

Accordingly, the present disclosure may monitor, calculate and verify the calibration bias in weather radar reflectivity in real time through monitoring of reflectivity intensity of ground echoes regardless weather conditions, self-consistency of dual-polarimetric variables and comparison of reflectivity between two radars.

Accordingly, it is possible to use high quality radar data through real-time calculation of calibration bias in radar reflectivity, and monitor changes in radar calibration bias after radar hardware inspection in real time.

Figure 9:
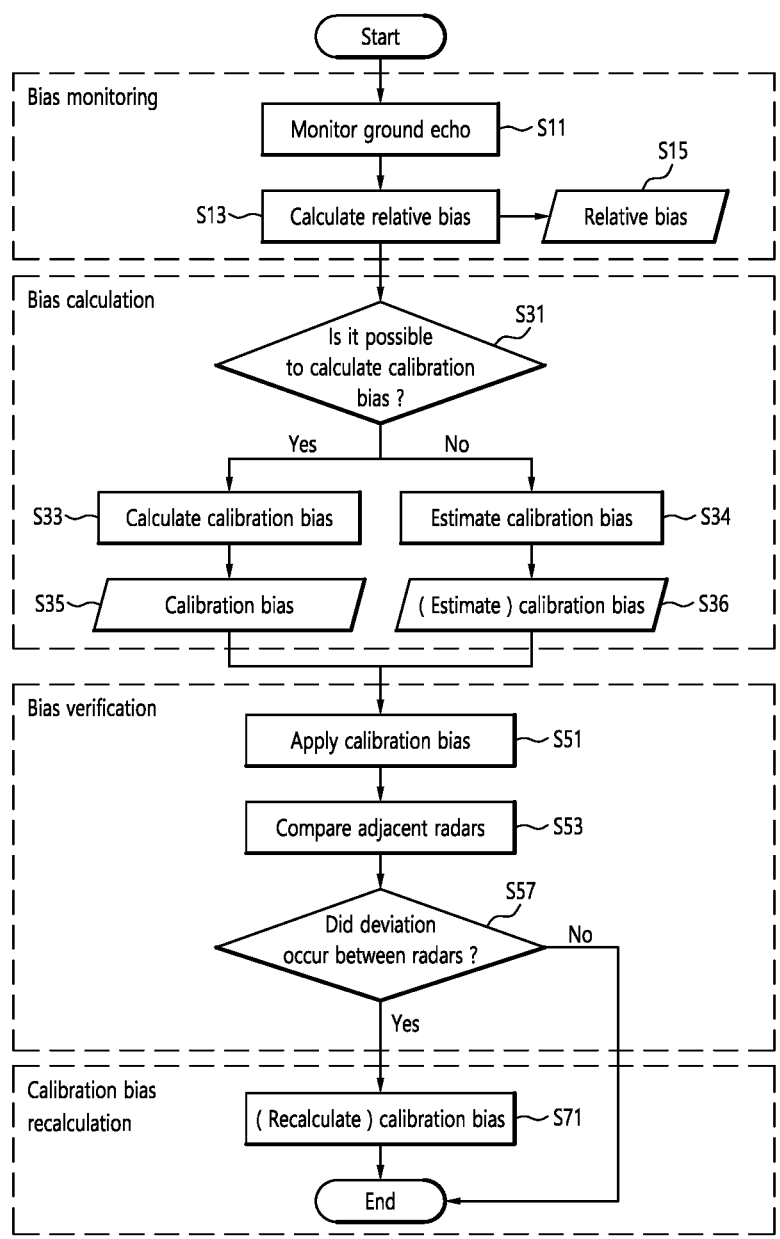
FIG. 9 is a flowchart of a method for real-time monitoring of a calibration bias in radar reflectivity according to an embodiment of the present disclosure.

FIG. 9 is a flowchart of a method for real-time monitoring of the calibration bias in radar reflectivity according to an embodiment of the present disclosure.

The method for real-time monitoring calibration bias in radar reflectivity according to this embodiment may be performed in substantially the same configuration as the device 10 of FIG. 1. Accordingly, the same element as the device 10 of FIG. 1 is given the same reference sign, and a repetitive description is omitted herein.

Additionally, the method for real-time monitoring of the calibration bias in radar reflectivity according to this embodiment may be performed by the software (application) for real-time monitoring of calibration bias in radar reflectivity.

Since ground echoes, which is an ever-present echo, have a very constant reflectivity value, the present disclosure uses them to monitor calibration bias changes. Accordingly, when the calibration bias in reflectivity is calculated using self-consistency between dual-polarimetric variables and ground echo reflectivity changes are monitored, the reflectivity may be calibrated in real time. Additionally, after the radar reflectivity is calibrated, when the reflectivity mean bias between two radars is calculated, the uniformity of observation data in the radar observation network may be verified.

The present disclosure calculates the calibration bias in reflectivity in real time by combining ground echo reflectivity monitoring, self-consistency of dual-polarimetric variables, and mean bias calculation between adjacent radars.

Referring to FIG. 9, the method for real-time monitoring of the calibration bias in radar reflectivity according to this embodiment is largely classified into bias monitoring, bias calculation, bias verification and calibration bias recalculation processes.

Specifically, radar reflectivity changes are monitored by calculating a relative bias of reflectivity based on an amount of change in reflectivity to ground echo reflectivity of a specific time. Subsequently, calibration bias in reflectivity is estimated from the relative bias of reflectivity and the differential phase based on self-consistency between dual-polarimetric variables for the rainfall period.

The calibration bias in reflectivity is verified by calculating a reflectivity mean bias through comparison of reflectivity of an overlapping area between two adjacent radars in the radar observation network by applying the estimated calibration bias to each radar. Finally, when the reflectivity mean bias between two adjacent radars is larger than the threshold, the calibration bias in reflectivity is recalculated.

First, the step of monitoring the ground echo reflectivity includes monitoring the ground echo (S11), calculating the relative bias (S13) and outputting the relative bias (S15).

Figure 10:
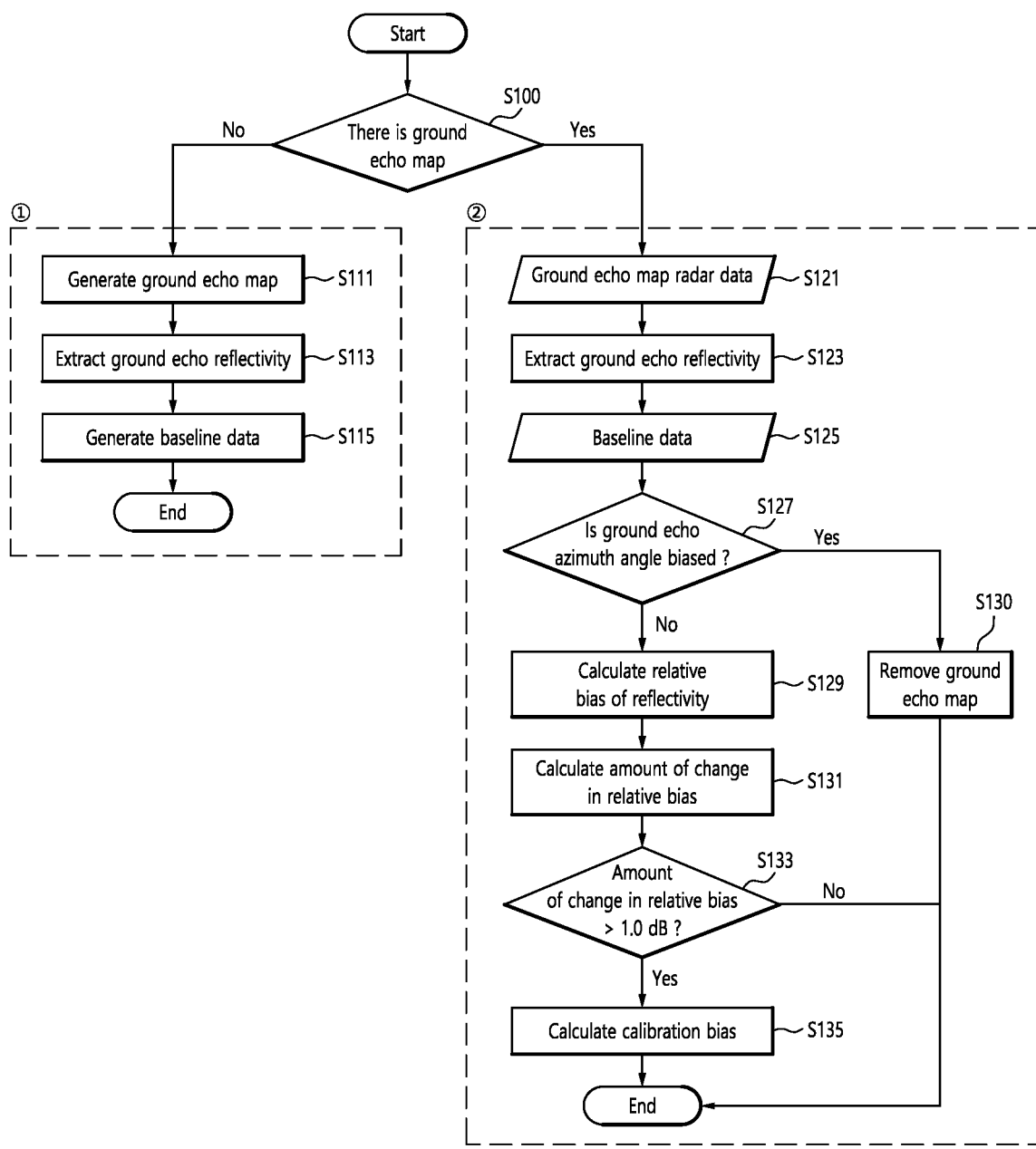
FIG. 10 is a flowchart detailing the calculation of relative bias of reflectivity through ground echo reflectivity monitoring of FIG. 9.

Referring to FIG. 10, in the step of monitoring the radar reflectivity changes, when there is no ground echo map (S100), a ground echo map is generated and the baseline is generated, and when there is a ground echo map (S100), a relative bias of reflectivity is calculated using the ground echo map and the baseline.

Specifically, when there is no ground echo map, the ground echo map is generated (S111), the ground echo reflectivity is extracted (S113), and the baseline data is generated (S115).

Figure 11:
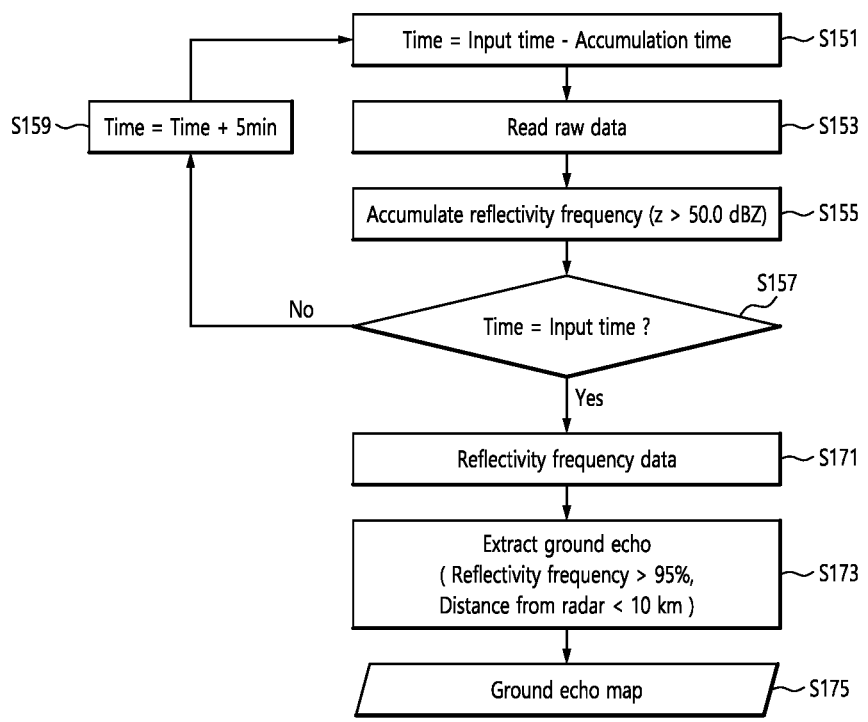
FIG. 11 is a flowchart detailing construction of the ground echo map through reflectivity frequency accumulation of FIG. 9.

Referring to FIG. 11, if the ground echo map does not exist, in the step of generating the ground echo map, the frequency of the reflectivity above the threshold (for example, 50 dBZ) is accumulated (S155) for each bin from raw data (S153) for the selected period (S151). Subsequently, as shown in Equation 1, when the frequency over the accumulation time, for example, within 10 km from radar is 95% or more, it is defined as ground echo (S173) and the ground echo map is generated (S175).

When there is a ground echo map, in the step of calculating the relative bias of reflectivity using the ground echo map and the baseline, first, ground echo reflectivity is extracted (S123) from the ground echo map (S121) within a predetermined time on the basis of input time.

The ground echo reflectivity statistics are calculated by arranging the extracted ground echo reflectivity in the ascending order, and determination is made as to whether the azimuth angle is biased by comparing the absolute value of a difference between a preset percentile of the baseline data (S125) and the same percentile of the corresponding time with a preset threshold (S127).

When it is determined that the azimuth angle is not rotated, a relative bias of reflectivity is calculated (S129). The change in relative bias is calculated from the calculated relative bias of reflectivity (S131), and when the calculated the change in relative bias is larger than a preset threshold (for example 1.0 dB) (S133), the calibration bias is calculated (S135).

In contrast, when it is determined that the azimuth angle is rotated, the corresponding ground echo map is removed for updating and the relative bias of the corresponding time is not calculated (S130).

Figure 12:
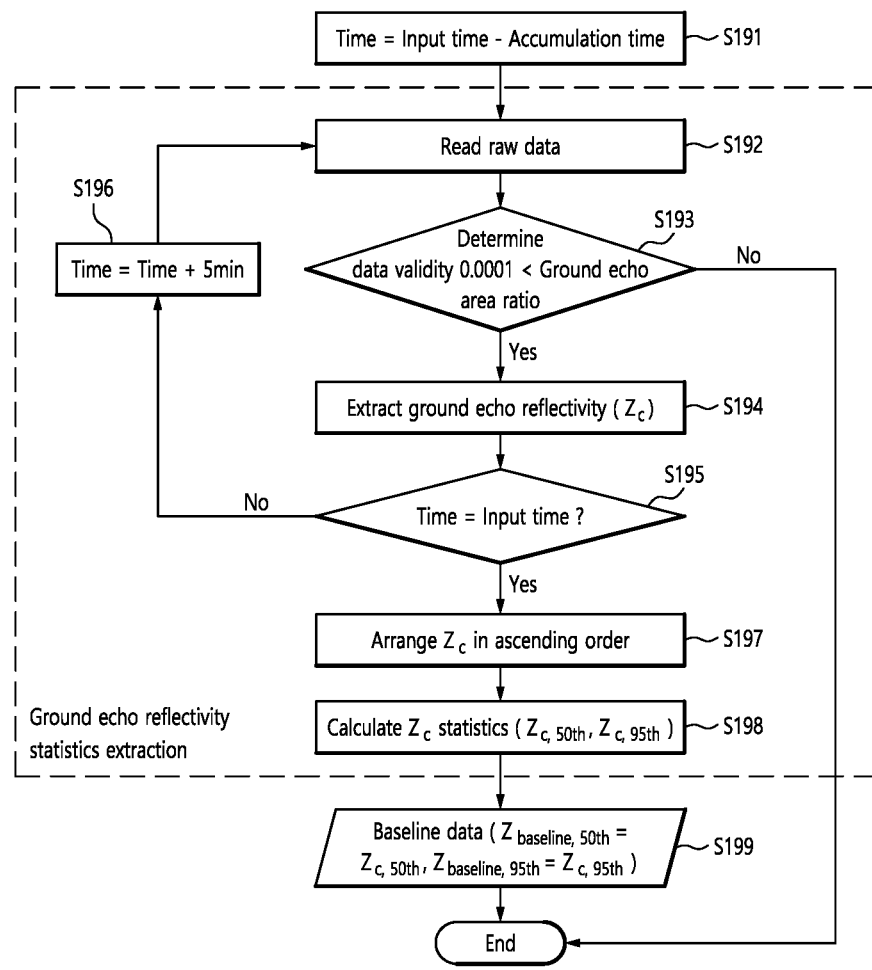
FIG. 12 is a flowchart detailing the determination of baseline data through ground echo reflectivity statistics extraction of FIG. 9.

Referring to FIG. 12, if the ground echo map does not exist, in the step of generating the ground echo map and the baseline, raw data for the selected period (S191, S195 and S196) is read (S192).

Subsequently, the validity of observation data is determined based on a ratio of ground echo area to the total observation area (for example 0.0001) from the defined ground echo (S193), and ground echo reflectivity is extracted from the valid observation data (S194). The ground echo reflectivity statistics are calculated by arranging the extracted ground echo reflectivity in the ascending order (S197).

To compare the calculated ground echo reflectivity statistics with the ground echo reflectivity statistics of the next time (S198), the baseline for azimuth slip determination and relative bias calculation is generated (S199).

In the step of estimating the calibration bias in reflectivity, depending on whether or not it is possible to calculate the calibration bias (S31), when precipitation exists, the calibration bias is calculated using self-consistency of reflectivity and specific differential phase shift (S33 and S35). In contrast, when there is no precipitation, the calibration bias is estimated using the change in relative bias and the calculated calibration bias (S34 and S36).

Specifically, when precipitation exists, in the step of calculating the calibration bias using self-consistency of reflectivity and specific differential phase shift, a differential phase pair is extracted from the precipitation area selected from radar volume data, and the calibration bias is calculated from the differential phase pair by determining if precipitation ended using a precipitation echo area ratio.

Figure 13:
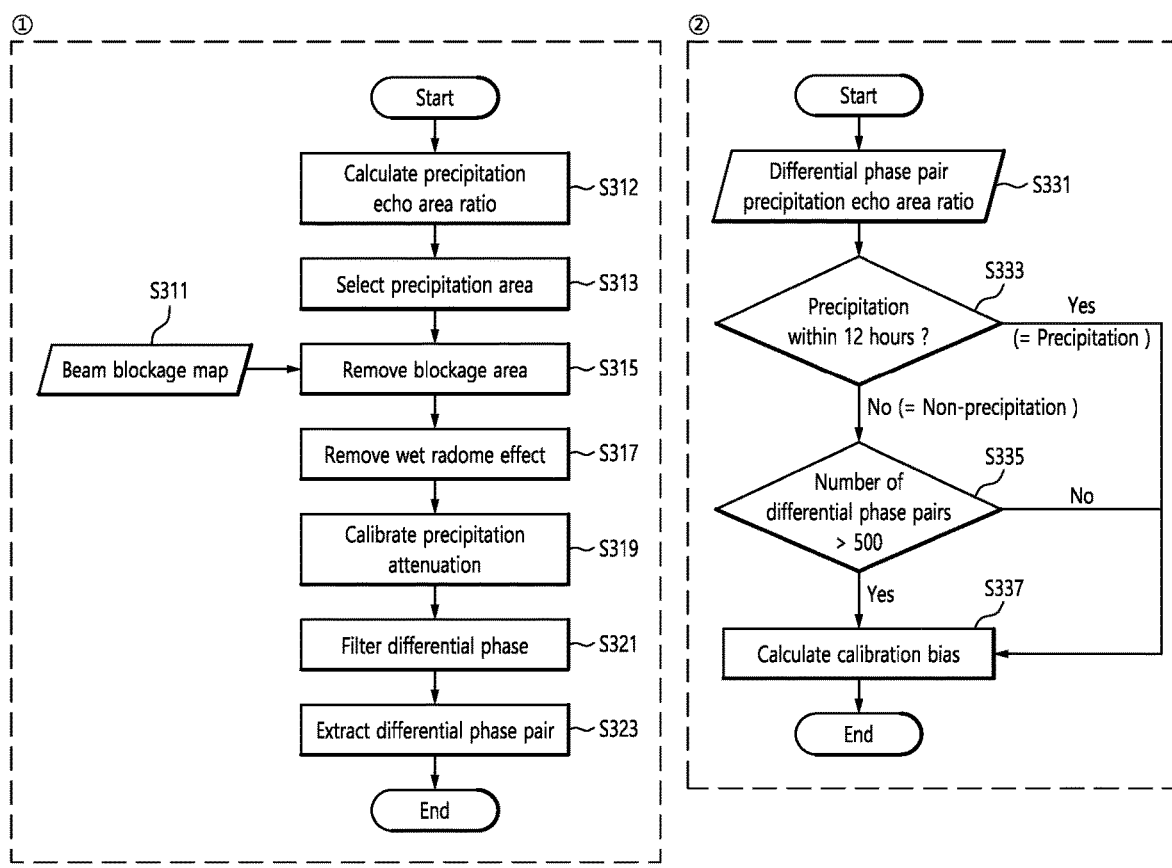
FIG. 13 is a flowchart detailing the calculation of calibration bias in reflectivity using self-consistency of dual-polarimetric variables of FIG. 9.

Referring to FIG. 13, in the step of extracting the differential phase pair, the precipitation echo area ratio is calculated from radar data (S312). The precipitation area is selected using a preset maximum distance and the cross-correlation coefficient (S313), and the influence of the observation bias except the calibration bias is removed (S315, S317 and S319).

For example, the step of removing the influence of the observation bias except the calibration bias may include removing a blockage area (S315) by excluding the azimuth angle when the BBF is equal to or larger than a preset threshold using a beam blockage map (S311), when an average of reflectivity observed in a preset range of bins is larger than a preset threshold, removing to avoid contamination by wet radome (S317), and correcting the precipitation attenuation-induced reflectivity loss by accumulating attenuation calculated using a reflectivity and attenuation relation equation for precipitation in the range direction (S319).

A differential phase is observed in the precipitation area free of the observation bias, filtering is applied at least once (S321), and then a differential phase pair is extracted (S323).

When there is no precipitation, the calibration bias is calculated (S337) from the differential phase pair (S335) by determining if precipitation ended using the precipitation echo area ratio to calculate the precipitation event based calibration bias for a predetermined time (S333, S354 and S355) from the differential phase pair and the precipitation echo area ratio (S331).

Figure 14:
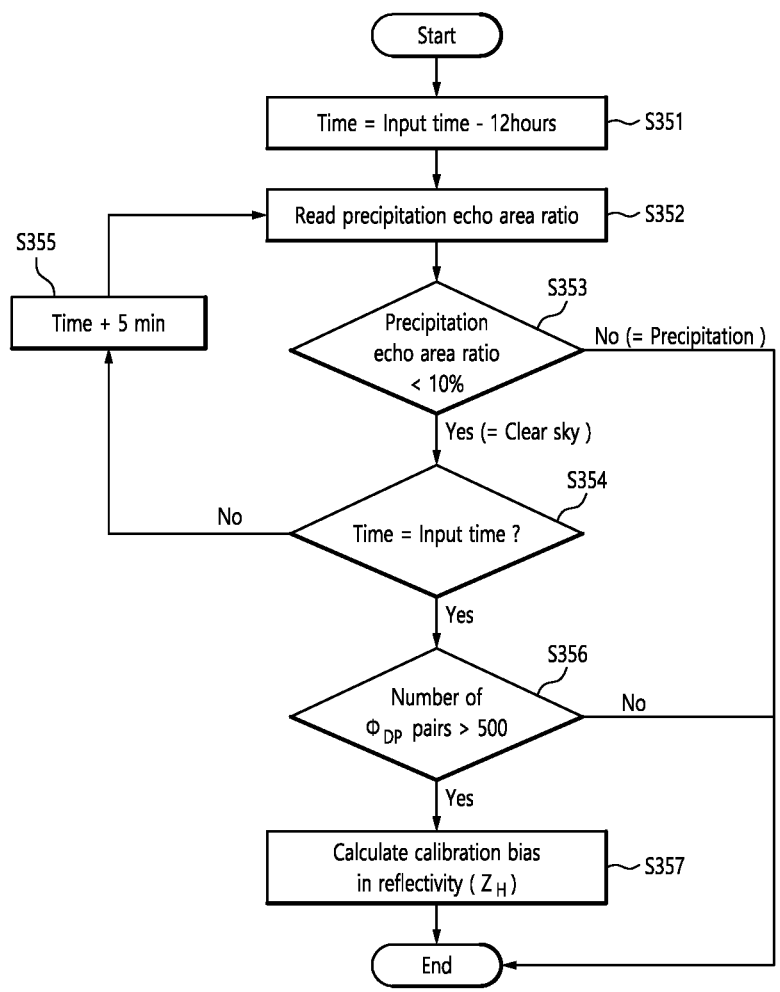
FIG. 14 is a flowchart detailing the non-rainfall period determination and the calculation of calibration bias in reflectivity of FIG. 9.

Referring to FIG. 14, the step of calculating the calibration bias includes analyzing the precipitation echo area ratio within a predetermined time earlier (S351) on the basis of input time (S352), and comparing the precipitation echo area ratio with a preset threshold (for example, 10%) (S353).

When the precipitation echo area ratio is less than the preset threshold, it is determined to be non-precipitation, and determination is made as to whether the number of extracted differential phase pairs is equal to or larger than a preset threshold (for example, 500) (S356). When the number of extracted differential phase pairs is equal to or larger than the preset threshold, the calibration bias in reflectivity is calculated (S357).

In the step of verifying the calibration bias in reflectivity, the calibration bias is applied to two adjacent radars, an overlapping area having the same distance and the same height is selected (S51), a reflectivity pair is extracted by calibrating the observation bias in reflectivity at the overlapping area (S53), and a reflectivity mean bias is calculated using the extracted reflectivity pair.

Figure 15:
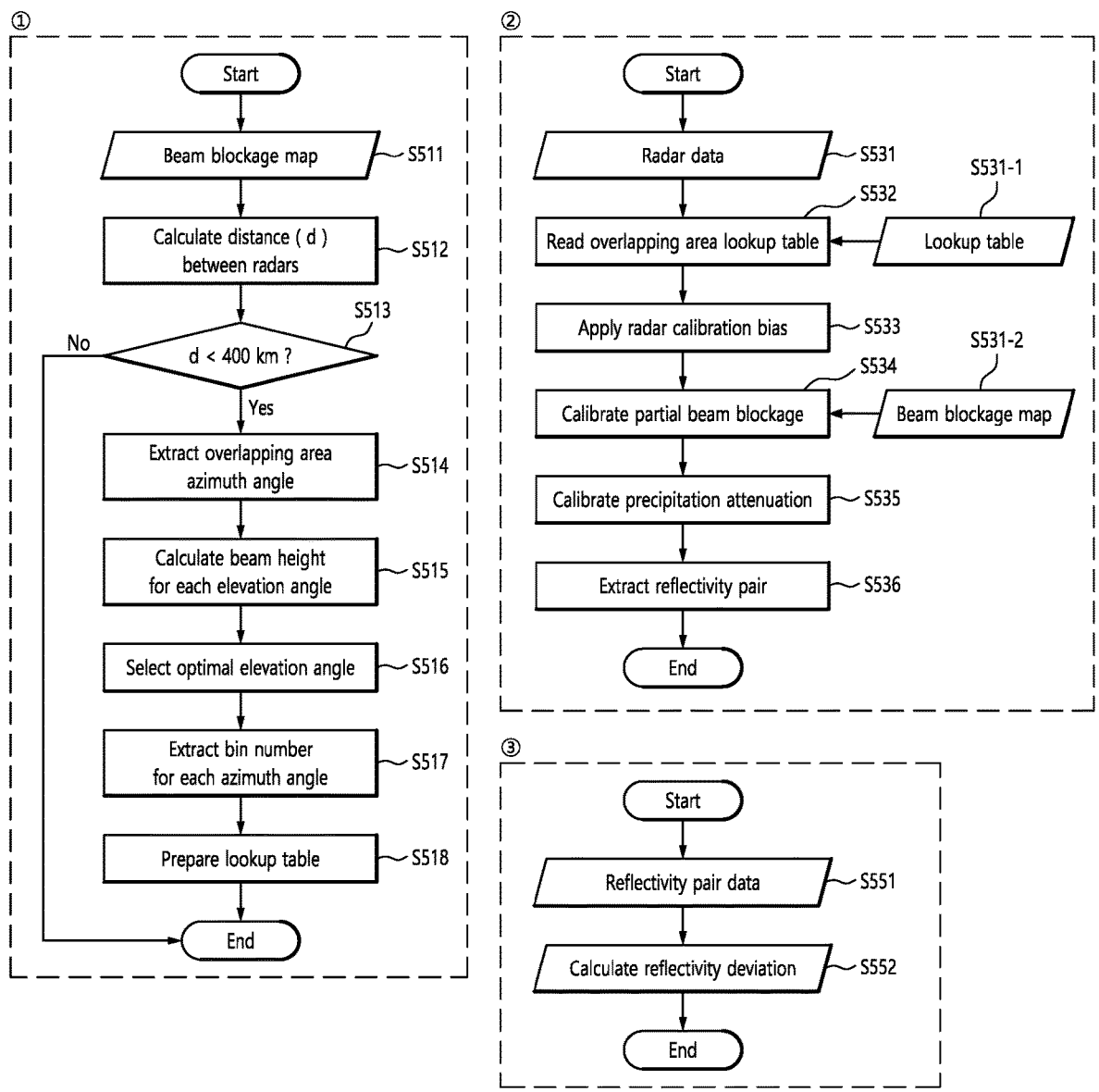
FIG. 15 is a flowchart detailing the calculation of reflectivity mean bias between adjacent radars of FIG. 9.

Referring to FIG. 15, in the step of selecting the overlapping area, observation areas of two adjacent radars and the distance d between the radars are calculated (S512) from the beam blockage map (S511).

The distance between two adjacent radars is compared with a preset threshold (for example, 400 km) (S513), and when the distance between two adjacent radars is smaller than the preset threshold, the azimuth angle of the overlapping area is extracted (S514).

Subsequently, the beam height for each elevation angle at the equidistant center between two adjacent radars is calculated (S515), and an optima elevation angle at which the calculated beam height is within a preset threshold range, the beam center is present in each other's beam width, and a height difference of the beam center is equal to or less than a preset threshold is selected (S516).

A bin in which the distance r from radar for the optimal elevation angle is equal to or less than a preset threshold is extracted (S517), and a lookup table including the elevation angle, the azimuth angle and the bin number for each site of the extracted bin is prepared (S518).

In the step of extracting the reflectivity pair, the estimated calibration bias in reflectivity is applied (S533) to radar data (S531), and a lookup table at the overlapping area is read (S532) from the lookup table (S531-1). Additionally, a beam blockage-induced reflectivity loss is corrected (S534) from the beam blockage map (S531-2).

The precipitation attenuation-induced reflectivity loss is corrected by accumulating attenuation calculated using the reflectivity and attenuation relation equation for precipitation in the range direction (S535), the blockage area is removed by excluding the azimuth angle at which the BBF is equal to or larger than a preset threshold, and the reflectivity pair in the overlapping area is extracted (S536).

In the step of calculating the reflectivity mean bias, the reflectivity mean bias between two radars in the overlapping area is calculated (S552) by calculating an average of reflectivity difference from the reflectivity pair (S551).

In the step of recalculating the calibration bias in reflectivity, when the reflectivity mean bias between two adjacent radars is larger than the threshold, radar that needs recalculation is determined by analyzing the reflectivity mean bias calculated through comparison with a different radar, and for the radar determined to need recalculation based on the mean bias calculated from the different radar, the calibration bias in reflectivity is recalculated (S71).

The method for real-time monitoring of the calibration bias in radar reflectivity may be implemented in the form of applications or program instructions that can be executed through a variety of computer components, and recorded in computer-readable recording media. The computer-readable recording media may include program instructions, data files and data structures, alone or in combination.

The program instructions recorded in the computer-readable recording media may be specially designed and configured for the present disclosure and may be those known and available to persons having ordinary skill in the field of computer software.

Examples of the computer-readable recording media include hardware devices specially designed to store and execute the program instructions, for example, magnetic media such as hard disk, floppy disk and magnetic tape, optical media such as CD-ROM and DVD, magneto-optical media such as floptical disk, and ROM, RAM and flash memory.

Examples of the program instructions include machine code generated by a compiler as well as high-level language code that can be executed by a computer using an interpreter. The hardware device may be configured to act as one or more software modules to perform the processing according to the present disclosure, and vice versa.

While the present disclosure has been hereinabove described with reference to the embodiments, those skilled in the art will understand that various modifications and changes may be made thereto without departing from the spirit and scope of the present disclosure defined in the appended claims.

The present disclosure has promising market or business prospects due to having the growing interest in the corresponding technology for use of high quality radar data in the related civil organizations and academic field. In particular, it is expected that the present disclosure will be used in meteorological and fire suppression service, engineering and sluice and aviation applications.

What is claimed is:
1. A method for monitoring a real-time calibration bias in radar reflectivity, the method comprising:
monitoring a radar reflectivity change by calculating a relative bias of reflectivity based on a change in reflectivity to ground echo reflectivity at a specific time, wherein the monitoring the radar reflectivity change comprises:
if there is no ground echo map, generating a ground echo map and a baseline for the relative bias of reflectivity, and if the ground echo map exists, calculating the relative bias of reflectivity using the ground echo map and the baseline;

estimating a calibration bias in reflectivity from the relative bias of reflectivity and a differential phase based on self-consistency between dual-polarimetric variables during a rainfall period;

verifying the calibration bias in reflectivity by calculating a reflectivity mean bias through a comparison of reflectivity of an overlapping area between two adjacent radars in a radar observation network by applying the calibration bias to each of the two adjacent radars; and recalculating the calibration bias in reflectivity when the reflectivity mean bias between the two adjacent radars is greater than a first threshold.

2. The method for monitoring a real-time calibration bias in radar reflectivity according to claim 1, wherein the step of the generating the ground echo map and the baseline for the relative bias of reflectivity comprises:

accumulating frequency of a reflectivity for each bin for a selected period, and defining as a ground echo;

determining a validity of observation data based on a ratio of ground echo area to a total observation area;

extracting a ground echo reflectivity from valid observation data;

calculating ground echo reflectivity statistics by arranging the extracted ground echo reflectivity in an ascending order; and generating a baseline for azimuth slip determination and a relative bias calculation to compare the ground echo reflectivity statistics with ground echo reflectivity statistics of next time.

3. The method for monitoring a real-time calibration bias in radar reflectivity according to claim 1, wherein the step of the calculating the relative bias of reflectivity using the ground echo map and the baseline comprises:

extracting the ground echo reflectivity from the ground echo map within a predetermined time based on input time;

calculating ground echo reflectivity statistics by arranging the ground echo reflectivity in an ascending order;

determining if an azimuth angle is rotated by comparing an absolute value of a difference between a preset percentile of baseline data and a same percentile of a corresponding time with a preset second threshold;

calculating the relative bias of reflectivity when determined that the azimuth angle is rotated;

calculating a change in a relative bias from the relative bias of reflectivity; and calculating the calibration bias when the change in the relative bias is larger than a preset third threshold.

4. The method for monitoring a real-time calibration bias in radar reflectivity according to claim 1, wherein the step of the calculating the relative bias of reflectivity using the ground echo map and the baseline further comprises:

if determined that an azimuth angle is rotated, removing a corresponding ground echo map for an update, and failing to calculate the relative bias at a corresponding time.

5. The method for monitoring a real-time calibration bias in radar reflectivity according to claim 1, wherein the step of the estimating the calibration bias in reflectivity comprises:

calculating the calibration bias using self-consistency of reflectivity and specific differential phase shift when a precipitation exists; and estimating the calibration bias using the change in relative bias and the calculated calibration bias when there is no precipitation.

6. The method for monitoring a real-time calibration bias in radar reflectivity according to claim 5, wherein the step of the calculating the calibration bias using self-consistency of reflectivity and specific differential phase shift when the precipitation exists comprises:

extracting a differential phase pair in a precipitation area selected from radar volume data; and calculating the calibration bias from the differential phase pair by determining if the precipitation ended using a precipitation echo area ratio.

7. The method for monitoring a real-time calibration bias in radar reflectivity according to claim 6, wherein extracting the differential phase pair comprises:

calculating the precipitation echo area ratio from radar data;

selecting the precipitation area using a preset maximum distance and a cross-correlation coefficient;

removing an influence of an observation bias except the calibration bias;

calculating the differential phase from reflectivity in the precipitation area from which the influence of the observation bias is removed; and extracting the differential phase pair by filtering an observed differential phase at least once.

8. The method for monitoring a real-time calibration bias in radar reflectivity according to claim 7, wherein removing the influence of the observation bias except the calibration bias comprises:

removing a blockage area by excluding an azimuth angle at which beam blockage fraction (BBF) is equal to or larger than a preset fourth threshold using a beam blockage map;

removing to avoid contamination by wet radome when an average of reflectivity observed in a preset bin range is larger than a preset fifth threshold; and correcting a precipitation attenuation-induced reflectivity loss by accumulating attenuation calculated using a reflectivity and attenuation relation equation for the precipitation in a range direction.

9. The method for monitoring a real-time calibration bias in radar reflectivity according to claim 6, wherein calculating the calibration bias comprises:

analyzing the precipitation echo area ratio within a predetermined time earlier based on input time;

comparing the precipitation echo area ratio with a preset sixth threshold;

determining to be a non-precipitation when the precipitation echo area ratio is less than a preset seventh threshold;

determining if a number of extracted differential phase pairs is equal to or larger than a preset eighth threshold when determined to be the non-precipitation; and calculating the calibration bias in reflectivity when the number of extracted differential phase pairs is equal to or larger than a preset ninth threshold.

10. The method for monitoring a real-time calibration bias in radar reflectivity according to claim 1, wherein the step of the verifying the calibration bias in reflectivity comprises:

selecting the overlapping area having a same distance and height as the two adjacent radars;

extracting a reflectivity pair by calibrating the observation bias in reflectivity at the overlapping area; and calculating the reflectivity mean bias using the reflectivity pair.

11. The method for monitoring a real-time calibration bias in radar reflectivity according to claim 10, wherein the step of the selecting the overlapping area comprises:
   calculating observation areas of the two adjacent radars and a distance (d) between the radars from a beam blockage map;
   comparing the distance between the two adjacent radars with a preset tenth threshold;
   extracting an azimuth angle of the overlapping area when the distance between the two adjacent radars is smaller than a preset eleventh threshold;
   calculating a beam height for each elevation angle at an equidistant center between the two adjacent radars;
   selecting an optimal elevation angle at which the beam height is within a preset threshold range, a beam center is present in each other's beam width, and a height difference of the beam center is equal to or less than a preset twelfth threshold;
   extracting a bin in which a distance (r) from the radar is equal to or less than a preset thirteenth threshold for the optimal elevation angle; and
   preparing a lookup table including the elevation angle, the azimuth angle, and a bin number for each site of the bin.

12. The method for monitoring a real-time calibration bias in radar reflectivity according to claim 11, wherein the step of the extracting the reflectivity pair comprises:
   applying the estimated calibration bias in reflectivity to radar data;
   correcting a beam blockage-induced reflectivity loss from the beam blockage map;
   correcting a precipitation attenuation-induced reflectivity loss by accumulating attenuation calculated using a reflectivity and attenuation relation equation for precipitation in a range direction;
   removing a blockage area by excluding the bin in which beam blockage fraction (BBF) is equal to or larger than a preset fourteenth threshold; and
   extracting the reflectivity pair in the overlapping area.

13. The method for monitoring a real-time calibration bias in radar reflectivity according to claim 12, wherein the step of the calculating the reflectivity mean bias comprises calculating the reflectivity mean bias between the two radars in the overlapping area by calculating an average of reflectivity difference from the reflectivity pair.

14. The method for monitoring a real-time calibration bias in radar reflectivity according to claim 13, wherein the step of the recalculating the calibration bias in reflectivity comprises:
   when the reflectivity mean bias between the two adjacent radars is larger than a fifteenth threshold, determining a radar that needs recalculation by analyzing the reflectivity mean bias calculated through the comparison with a different radar; and
   recalculating the calibration bias in reflectivity for the radar determined to need recalculation based on the mean bias calculated from the different radar.

15. A non-transitory computer-readable storage medium having recorded thereon a computer program for performing the method for monitoring a real-time calibration bias in radar reflectivity according to claim 1.

16. A device for monitoring a real-time calibration bias in radar reflectivity, the device comprising:
   a bias monitoring unit to monitor a radar reflectivity change by calculating a relative bias of reflectivity based on a change in reflectivity to ground echo reflectivity at a specific time, wherein monitoring the radar reflectivity change comprises:
      if there is no ground echo map, generating a ground echo map and a baseline for the relative bias of reflectivity, and
      if the ground echo map exists, calculating the relative bias of reflectivity using the ground echo map and the baseline;
   a bias calculation unit to estimate calibration bias in reflectivity from the relative bias of reflectivity and a differential phase based on self-consistency between dual-polarimetric variables during a rainfall period;
   a bias verification unit to verify the calibration bias in reflectivity by calculating a reflectivity mean bias through comparison of reflectivity of an overlapping area between two adjacent radars in a radar observation network by applying the estimated calibration bias to each radar; and
   a calibration bias recalculation unit to recalculate the calibration bias in reflectivity when the reflectivity mean bias between the two adjacent radars is larger than a threshold.

* * * * *